US008446455B2

(12) United States Patent
Lian et al.

(10) Patent No.: US 8,446,455 B2
(45) Date of Patent: May 21, 2013

(54) SYSTEM AND METHOD FOR EXCHANGING INFORMATION IN A VIDEO CONFERENCE ENVIRONMENT

(75) Inventors: TiongHu Lian, Cupertino, CA (US);
Chris A. Dunn, Livermore, CA (US);
Brian J. Baldino, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 250 days.

(21) Appl. No.: 12/963,324

(22) Filed: Dec. 8, 2010

(65) Prior Publication Data

US 2012/0147123 A1 Jun. 14, 2012

(51) Int. Cl.
*H04N 7/15* (2006.01)

(52) U.S. Cl.
USPC ............... 348/14.09; 348/14.08; 348/14.12

(58) Field of Classification Search
USPC ..... 348/14.01–14.16; 370/260–261; 709/204; 715/753
See application file for complete search history.

(56) References Cited

U.S. PATENT DOCUMENTS

| | | | |
|---|---|---|---|
| 3,519,744 A | 7/1970 | Dorros et al. | |
| 3,601,530 A | 8/1971 | Edson et al. | |
| 3,718,770 A | 2/1973 | Reese | |
| 3,944,736 A | 3/1976 | Shepard | |
| 4,054,908 A | 10/1977 | Poirier et al. | |
| 4,267,593 A | 5/1981 | Regan et al. | |
| 4,400,724 A | 8/1983 | Fields | |
| 4,449,238 A | 5/1984 | Lee et al. | |
| 4,494,144 A | 1/1985 | Brown | |
| 4,531,024 A | 7/1985 | Colton et al. | |
| 4,961,211 A | 10/1990 | Tsugane et al. | |
| 4,965,819 A | 10/1990 | Kannes | |
| 5,272,526 A | 12/1993 | Yoneta et al. | |
| 5,491,797 A | 2/1996 | Thompson et al. | |
| 5,508,733 A | 4/1996 | Kassatly | |
| 5,541,639 A | 7/1996 | Takatsuki et al. | |
| 5,673,256 A | 9/1997 | Maine | |
| 5,675,374 A | 10/1997 | Kohda | |
| 5,737,011 A | 4/1998 | Lukacs | |
| 5,751,337 A | 5/1998 | Allen et al. | |

(Continued)

FOREIGN PATENT DOCUMENTS

EP 1690428 8/2006
WO WO 2005/060501 7/2005

(Continued)

OTHER PUBLICATIONS

U.S. Appl. No. 12/963,387, entitled "System and Method for Controlling Video Data to be Rendered in a Video Conference Environment," filed Dec. 8, 2010; Inventor(s) Alan J. MacDonald et al.

(Continued)

*Primary Examiner* — Melur Ramakrishnaiah
(74) *Attorney, Agent, or Firm* — Patent Capital Group

(57) ABSTRACT

A method is provided in one example embodiment and includes monitoring a plurality of inputs associated with end users involved in a video session in which a plurality of displays are used. At least one of the inputs is associated with a frequency of speech of the end users. The method also includes determining a participation level for each of the end users based on the inputs, and determining which image data associated with the end users is to be rendered on a selected one of the plurality of displays based on the participation levels.

20 Claims, 6 Drawing Sheets

U.S. PATENT DOCUMENTS

| | | | |
|---|---|---|---|
| 5,790,179 | A | 8/1998 | Shibata et al. |
| 5,801,756 | A | 9/1998 | Iizawa |
| 5,802,294 | A | 9/1998 | Ludwig et al. |
| 5,903,637 | A | 5/1999 | Hogan et al. |
| 6,049,694 | A | 4/2000 | Kassatly |
| 6,172,703 | B1 | 1/2001 | Lee |
| 6,346,962 | B1 | 2/2002 | Goodridge |
| 6,396,531 | B1 | 5/2002 | Gerszberg et al. |
| 6,577,807 | B1 | 6/2003 | Yaegashi et al. |
| 6,611,503 | B1 | 8/2003 | Fitzgerald et al. |
| 6,710,797 | B1 | 3/2004 | McNelley et al. |
| 6,711,212 | B1 | 3/2004 | Lin |
| 6,757,277 | B1 | 6/2004 | Shaffer et al. |
| 6,774,927 | B1 | 8/2004 | Cohen et al. |
| 6,775,247 | B1 | 8/2004 | Shaffer et al. |
| 6,795,108 | B2 | 9/2004 | Jarboe et al. |
| 6,798,441 | B2 | 9/2004 | Hartman et al. |
| 6,882,358 | B1 | 4/2005 | Schuster et al. |
| 6,886,036 | B1 | 4/2005 | Santamaki et al. |
| 6,922,718 | B2 | 7/2005 | Chang |
| 6,981,047 | B2 | 12/2005 | Hanson et al. |
| 6,989,836 | B2 | 1/2006 | Ramsey |
| 6,992,702 | B1 | 1/2006 | Foote et al. |
| 6,999,829 | B2 | 2/2006 | Bazzocchi et al. |
| 7,027,659 | B1 | 4/2006 | Thomas |
| 7,038,588 | B2 | 5/2006 | Boone et al. |
| 7,039,027 | B2 | 5/2006 | Bridgelall |
| 7,043,528 | B2 | 5/2006 | Schmitt et al. |
| 7,050,425 | B2 | 5/2006 | Richter et al. |
| 7,054,268 | B1 | 5/2006 | Parantainen et al. |
| 7,057,636 | B1 | 6/2006 | Cohen-Solal et al. |
| 7,068,299 | B2 | 6/2006 | Lemieux et al. |
| 7,080,105 | B2 | 7/2006 | Nakanishi et al. |
| 7,092,002 | B2 | 8/2006 | Ferren et al. |
| 7,111,045 | B2 | 9/2006 | Kato et al. |
| 7,151,758 | B2 | 12/2006 | Kumaki et al. |
| 7,154,526 | B2 | 12/2006 | Foote et al. |
| 7,203,904 | B2 | 4/2007 | Lee |
| 7,245,272 | B2 | 7/2007 | Shiuan et al. |
| 7,256,822 | B2 | 8/2007 | Suga et al. |
| 7,277,117 | B2 | 10/2007 | Takashima et al. |
| 7,515,174 | B1 | 4/2009 | Francisco et al. |
| 7,532,232 | B2 | 5/2009 | Shah et al. |
| 7,707,247 | B2 | 4/2010 | Dunn et al. |
| 2002/0099682 | A1 | 7/2002 | Stanton et al. |
| 2002/0103864 | A1 | 8/2002 | Rodman et al. |
| 2003/0071890 | A1 | 4/2003 | McClure |
| 2003/0149724 | A1 | 8/2003 | Chang |
| 2004/0004942 | A1 | 1/2004 | Nebiker et al. |
| 2004/0010464 | A1 | 1/2004 | Boaz |
| 2004/0236830 | A1 | 11/2004 | Nelson et al. |
| 2004/0264390 | A1* | 12/2004 | Suzuki ........................ 370/260 |
| 2005/0024484 | A1 | 2/2005 | Leonard et al. |
| 2005/0050154 | A1 | 3/2005 | Gossweiler et al. |
| 2005/0248652 | A1 | 11/2005 | Firestone et al. |
| 2005/0260976 | A1 | 11/2005 | Khartabil et al. |
| 2006/0041571 | A1 | 2/2006 | Kubokawa |
| 2006/0066717 | A1 | 3/2006 | Miceli |
| 2006/0129626 | A1 | 6/2006 | Fitzpatrick et al. |
| 2006/0152575 | A1 | 7/2006 | Amiel et al. |
| 2006/0158509 | A1 | 7/2006 | Kenoyer et al. |
| 2006/0168302 | A1 | 7/2006 | Boskovic et al. |
| 2006/0200518 | A1 | 9/2006 | Sinclair et al. |
| 2006/0251038 | A1 | 11/2006 | Tamura et al. |
| 2006/0259193 | A1 | 11/2006 | Wang et al. |
| 2006/0264207 | A1 | 11/2006 | Tamura et al. |
| 2007/0070940 | A1 | 3/2007 | Vander Veen et al. |
| 2007/0206091 | A1 | 9/2007 | Dunn et al. |
| 2007/0211141 | A1* | 9/2007 | Christiansen .............. 348/14.08 |
| 2007/0250567 | A1 | 10/2007 | Graham |
| 2008/0062625 | A1 | 3/2008 | Batio |
| 2008/0136896 | A1 | 6/2008 | Graham et al. |
| 2008/0246834 | A1* | 10/2008 | Lunde et al. ............... 348/14.09 |
| 2008/0266380 | A1 | 10/2008 | Gorzynski et al. |
| 2008/0267282 | A1* | 10/2008 | Kalipatnapu et al. .... 375/240.01 |
| 2009/0009587 | A1 | 1/2009 | Lindbergh |
| 2009/0174764 | A1 | 7/2009 | Chadha et al. |
| 2009/0213207 | A1 | 8/2009 | Shah et al. |
| 2010/0013905 | A1 | 1/2010 | Kumar et al. |
| 2010/0149305 | A1* | 6/2010 | Catchpole et al. ......... 348/14.08 |
| 2010/0182394 | A1 | 7/2010 | Zhan |
| 2010/0309284 | A1* | 12/2010 | Samadani et al. ......... 348/14.08 |
| 2010/0315482 | A1* | 12/2010 | Rosenfeld et al. ......... 348/14.08 |
| 2012/0147123 | A1 | 6/2012 | Lian et al. |

FOREIGN PATENT DOCUMENTS

| | | |
|---|---|---|
| WO | WO 2005/062569 | 7/2005 |
| WO | WO 2006/044097 | 4/2006 |
| WO | WO 2006/062700 | 6/2006 |
| WO | WO 2007/123965 | 11/2007 |

OTHER PUBLICATIONS

Davis, Andrew, "Video Communications Industry Backgrounder," Wainhouse Research, 4 pages; [Retrieved and printed on Dec. 7, 2010] www.tandberg.net.

Froba, B., et al., "Rapid Hand Gesture Detection for Human Computer interface," (Abstract Only) Computer Graphics and Imaging—2002, 1 page; http://www.actapress.com/PaperInfo.aspx?PaperID=25959.

Johanson, Brad, et al., "Multibrowsing: Moving Web Content across Multiple Displays," Proc. Ubiquitous Computing Conference (UBICOMP), 2001, 9 pages; http://www.graphics.stanford.edu/papers/imultibrowsing/multibrowse_paper.html.

Lambert, Dave, "Polycom Video Communications," ©2004 *Polycom, Inc.*, Jun. 20, 2004, 4 pages; http://www.polycom.com/global/documents/whitepapers/video_communications_h.239_people_content_polycom_patented_technology.pdf.

"LG Electronics Unveils New Push-To-View Technology," Mobiledia, Feb. 14, 2005, 3 pages; http://www.mobiledia.com/news/25797.html.

Quemada, Juan, et al., "Isabel: An Application for real time Collaboration with a flexible Floor Control," Collaborative Computing: Networking, Applications and Worksharing, 2005 International Conference; 9 pages; http://ieeexplore.ieee.org/iel5/10986/34623/01651238.pdf.

"Samsung Demonstrates Push-To-All Technology," Samsung.com, Feb. 25, 2005, 1 page; http://www.samsung.com/us/news/newsPreviewRead.do?news_seq=2564.

Weinstein, Ira, et al. "Emerging Technologies for Teleconferencing and Telepresence," Wainhouse Research, 2005, 54 pages. http://www.wrplatinum.com/content.aspx?Relo=1&CID=4382.

Ylitalo, Jukka, et al., "Re-thinking Security in IP based Micro-Mobility," 2005, 12 pages; www.tcs.hut.fi/Studies/T-79.5401/2005AUT/ISC04-Vlitalo-4-al.pdf.

USPTO Mar. 6, 2013 Non-Final Office Action from U.S. Appl. No. 12/963,387.

\* cited by examiner

SYSTEM AND METHOD FOR EXCHANGING INFORMATION IN A VIDEO CONFERENCE ENVIRONMENT

TECHNICAL FIELD

This disclosure relates in general to the field of communications, and more particularly, to exchanging information in a video conference environment.

BACKGROUND

Video services have become increasingly important in today's society. In certain architectures, service providers may seek to offer sophisticated videoconferencing services for their end users. The videoconferencing architecture can offer an "in-person" meeting experience over a network. Videoconferencing architectures can deliver real-time, face-to-face interactions between people using advanced visual, audio, and collaboration technologies. Some issues have arisen in videoconferencing scenarios when a multiscreen endpoint joins a multipoint meeting, where there may be more participants than the number of available displays. The ability to optimize display use during a video conference presents a significant challenge to developers and designers, who attempt to offer a videoconferencing solution that is realistic and that mimics a real-life meeting.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes monitoring a plurality of inputs associated with end users involved in a video session in which a plurality of displays are used. At least one of the inputs is associated with a frequency of speech of the end users. The method also includes determining a participation level for each of the end users based on the inputs, and determining which image data associated with the end users is to be rendered on a selected one of the plurality of displays based on the participation levels.

In more specific implementations, the determining of the participation level includes calculating numeric values associated with the participation levels, where the numeric values are used to assign virtual positions for the end users during the video session. In other instances, one of the participation levels of the end users is preconfigured to have a base level that is higher than the participation levels of the other end users. The base level can be set in accordance with an identity of one of the end users (e.g., title, rank, employment status, organizational hierarchy, etc.).

In yet other example configurations, the inputs include body language characteristics and eye gaze metrics of the end users. Additionally, the inputs can include a volume of speech associated with the end users. The inputs can be weighted differently in order to determine the participation levels for each of the end users. The participation levels can be adjusted by an administrator during the video session. In general, a higher participation level for a selected one of the end users is prioritized over a lower participation level for another one of the end users. Hence, the end user having the highest participation level would have their associated image data rendered on a given display.

Example Embodiments

Figure 1:
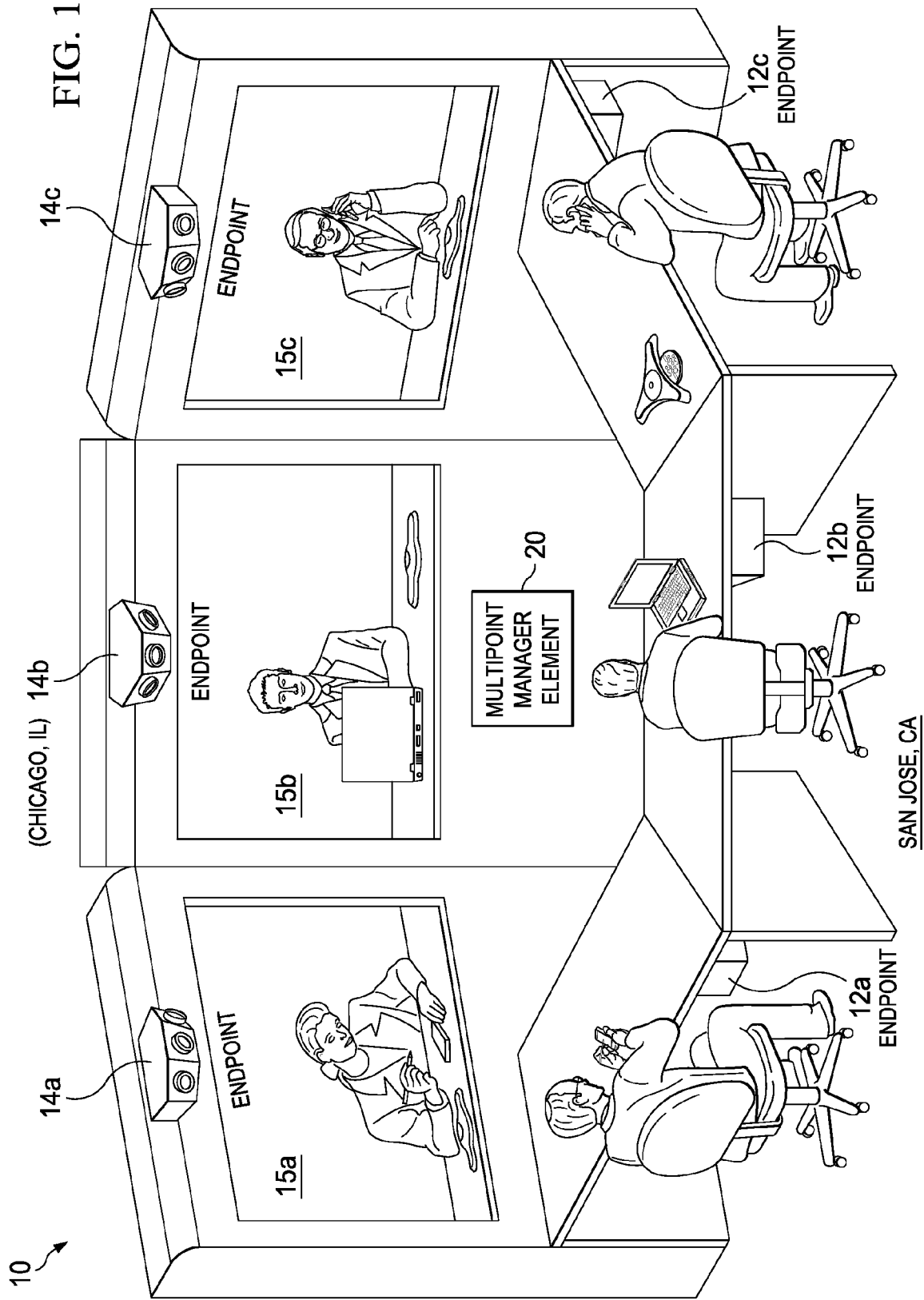
FIG. 1 is a simplified schematic diagram of a communication system for exchanging information in a conferencing environment in accordance with one embodiment.

Turning to FIG. 1, FIG. 1 is a simplified schematic diagram illustrating a communication system 10 for conducting a video conference in accordance with one example embodiment. FIG. 1 includes multiple endpoints associated with various end users of the video conference. In general, endpoints may be geographically separated, where in this particular example, endpoints 12a-c are located in San Jose, Calif. and counterparty endpoints are located in Chicago, Ill. FIG. 1 includes a multipoint manager element 20 coupled to endpoints 12a-c. Note that the numerical and letter designations assigned to the endpoints do not connote any type of hierarchy; the designations are arbitrary and have been used for purposes of teaching only. These designations should not be construed in any way to limit their capabilities, functionalities, or applications in the potential environments that may benefit from the features of communication system 10.

In this example, each endpoint is fitted discreetly along a desk and is proximate to its associated participant. Such endpoints could be provided in any other suitable location, as FIG. 1 only offers one of a multitude of possible implementations for the concepts presented herein. In one example implementation, the endpoints are videoconferencing endpoints, which can assist in receiving and communicating video and audio data. Other types of endpoints are certainly within the broad scope of the outlined concept, and some of these example endpoints are further described below. Each endpoint is configured to interface with a respective multipoint manager element, such as multipoint manager element 20, which helps to coordinate and to process information being transmitted by the end users.

As illustrated in FIG. 1, a number of cameras 14a-14c and displays 15a-15c are provided for the conference. Displays 15a-15c render images to be seen by the end users and, in this particular example, reflect a three-display design (e.g., a 'triple'). Note that as used herein in this specification, the term 'display' is meant to connote any element that is capable of rendering an image during a video conference. This would necessarily be inclusive of any panel, screen, Telepresence display or wall, computer display, plasma element, television, monitor, or any other suitable surface or element that is capable of such rendering.

The components of communication system 10 may use specialized applications and hardware to create a system that can leverage a network. Communication system 10 can use Internet protocol (IP) technology and can run on an integrated voice, video, and data network. The system can also support high quality, real-time voice, and video communications using broadband connections. It can further offer capabilities for ensuring quality of service (QoS), security, reliability, and high availability for high-bandwidth applications such as video. Power and Ethernet connections for all end users can be provided. Participants can use their laptops to access data for the meeting, join a meeting place protocol or a Web session, or stay connected to other applications throughout the meeting.

As a general proposition, the videoconferencing technology of communication system 10 can be configured to create an in-person meeting experience for its participants. To replicate the conference room experience, the architecture is configured to provide a mechanism for intelligently (and autonomously) rendering images (on videoconferencing displays) of certain participants, who exude high levels of participation. Conversely, the system can also identify low levels of involvement of participants and, accordingly, minimize their associated images on the displays. This can better simulate the experience of a conversation that occurs in an actual conference room.

For purposes of illustrating certain example techniques of communication system 10, it is important to understand the communications that may be traversing the network. The following foundational information may be viewed as a basis from which the present disclosure may be properly explained. One objective in videoconferencing is to maintain eye gaze and balance amongst the participants. For example, a videoconferencing system employing three panels would seek to avoid a scenario in which eleven people are competing for one panel, while a single (potentially inactive) person is being rendered on another panel. Hence, screen real estate is a scarce resource in videoconferencing architectures. Accordingly, it needs to be optimally managed to enhance the end user experience. In the aforementioned scenario, certain screen real estate is in contention, whereas other screen real estate is available for immediate use.

Current videoconferencing architectures use blunt mechanisms to determine image rendering of participants during a video session. For example, many existing videoconferencing systems use a 'least-recently-used' kickout scheme for the placement of their end users. As someone new begins speaking, whoever has not spoken recently (and who is currently being shown) would be displaced by a different end user. In one general sense, there is nominal intelligence behind this image rendering decision. Furthermore, such systems fail to provide a realistic environment that mimics in-person meetings. For example, in any conversation, a natural hierarchy typically emerges amongst the end users. This can be attributed to the activity levels of the participants, their command of the subject matter, their stature in an organization, etc. Ideally, when a video session involves a number of individuals forced to share display space (i.e., no party has an exclusive display devoted to their image), there is one active, authoritative person at each screen of the videoconferencing architecture.

In accordance with one embodiment, communication system 10 can overcome these shortcomings (and others) in providing an intelligent videoconferencing architecture that dynamically adjusts its image rendering operations based on various inputs. This would enhance the user experience by offering an effective placement of participants on screens in a multiscreen endpoint. More specifically, communication system 10 can maintain positioning priorities, such as spatial consistency and eye-gaze alignment, while also monitoring the behavior of end users over the course of a conference. Each end user may be assigned a virtual position based on participation levels (e.g., numeric values). The virtual position determines the display for rendering image data associated with a given end user.

The participation value may be normalized, used to indicate the relative importance of a participant in a conference, and derived based on various participation inputs. For example, an end user may be assigned a participation value when the end user first speaks, and that value may diminish as time passes without further speaking. Thus, an active speaker can accumulate more value than a passive end user can. Another example criterion may relate to the eye contact of participants, where a lack of eye contact would reduce the participation levels. [Note that the term 'eye contact' is included within the broader term 'eye gaze metrics' as used herein in this Specification.] Eye gaze metrics could further include instances weighing against the participation level such as when individuals stare downward (e.g., at a laptop), turn to counterparties (e.g., indicative of a private conversation outside the video conference), become preoccupied and look away from the video screens (e.g., when a given individual uses their own private telephone), etc. The participation level can then be correlated to the intelligent placement of individuals on the screens.

In operation during a video session, the total participation value of a participant is used by multipoint manager element 20 to assign a virtual position to the end user and, further, to determine when the end user should be displayed (or displaced) to improve the meeting experience. However, frequent virtual position adjustment can also adversely affect the meeting experience, and communication system 10 may further incorporate appropriate limits on the frequency of participant re-positioning.

Thus, image rendering on specific screens can be based on participation levels, which may further include an active level of speech, body language, eye gaze metrics, or any other suitable characteristic that would be indicative of a participation level. Operationally, the initial participation level settings can be preconfigured before a video conference was initiated. However, even if the participation levels were to the preconfigured, the participation levels can still be dynamically updated, manually updated (e.g., by administrator, by the individual themselves, etc.), or adjusted using any appropriate feedback mechanisms, as outlined here in this Specification.

Logistically, multipoint manager element 20 is configured to monitor (i.e., access, evaluate, determine, assess, etc.) the video session (e.g., in real-time) for a variety of inputs. As used herein in this Specification, the term 'input' is inclusive of volume of speech, eye gaze, body language characteristics (inclusive of nodding, slouching, hand and arm gestures, posture, leg crossing, fidgeting, etc.), frequency of speech, identity of an individual, rank of the individual relative to other individuals, job title, default inputs, preconfigured inputs, or any other suitable parameter, attribute, or characteristic that can be associated with participation levels. All of these inputs can be assessed on a numeric scale (e.g., 1-100).

Furthermore, as these inputs are monitored, they can be evaluated or weighted differently (e.g., speech being accorded a higher weight for determining the participation level, in contrast to simple body language, which may be less certain to quantify). In another instance, nodding (which is part of the body language) may be accorded a higher weight than eye gaze. All of these inputs can be used in conjunction with inputs associated with identity, pre-configurations, default settings, etc. in order to determine appropriate participation levels of participants.

In various embodiments presented herein, one of the inputs to be used as a basis for forming a participation level can include the identity of the person. In such a configuration, a given individual may be attributed to a higher base level of participation, where that individual may represent an authoritative speaker, a manager, a vice president, etc. Such individuals would have a higher participation level initially (e.g., provisioned by default). Reciprocally, individuals can be assigned lower participation levels from the outset of the videoconferencing session. For example, a vice president (even though his stature may dictate one type of participation level) may be relegated to a lower initial participation level based on his minimal involvement in a particular subject area or project, which is to be discussed during the videoconferencing call. Furthermore, a given administrator can personally assess participation levels (e.g., notices someone who is highly involved in the discussion, or who is preoccupied, etc.) and tweak the participation levels, or suitably override the current participation levels such that image rendering can be managed directly by that administrator. Any such provisioning can readily be accommodated by the flexible architecture of communication system 10.

Before turning to some of the additional operations of communication system 10, a brief discussion is provided about some of the infrastructure of FIG. 1. Endpoint 12a may be used by someone wishing to participate in a video conference in communication system 10. The term 'endpoint' may be inclusive of devices used to initiate a communication, such as a switch, a console, a proprietary endpoint, a telephone, a bridge, a computer, a personal digital assistant (PDA), a laptop or electronic notebook, an i-Phone, an iPad, a Google Droid, any other type of smartphone, or any other device, component, element, or object capable of initiating voice, audio, or data exchanges within communication system 10.

Endpoint 12a may also be inclusive of a suitable interface to an end user, such as a microphone, a display, or a keyboard or other terminal equipment. Endpoint 12a may also include any device that seeks to initiate a communication on behalf of another entity or element, such as a program, a database, or any other component, device, element, or object capable of initiating a voice or a data exchange within communication system 10. Data, as used herein, refers to any type of video, numeric, voice, or script data, or any type of source or object code, or any other suitable information in any appropriate format that may be communicated from one point to another. Additional details relating to endpoints are provided below with reference to FIG. 2.

In operation, multipoint manager element 20 can be configured to establish, or to foster a video session between one or more end users, which may be located in various other sites and locations. Multipoint manager element 20 can also coordinate and process various policies involving endpoints 12a-c. In general, multipoint manager element 20 may communicate with endpoints 12a-c through any standard or proprietary conference control protocol. Multipoint manager element 20 includes a switching component that determines which signals are to be routed to individual endpoints 12a-c. Multipoint manager element 20 can also determine how individual end users are seen by others involved in the video conference. Furthermore, multipoint manager element 20 can control the timing and coordination of this activity. Multipoint manager element 20 can also include a media layer that can copy information or data, which can be subsequently retransmitted or simply forwarded along to one or more endpoints 12a-c.

Figure 2:
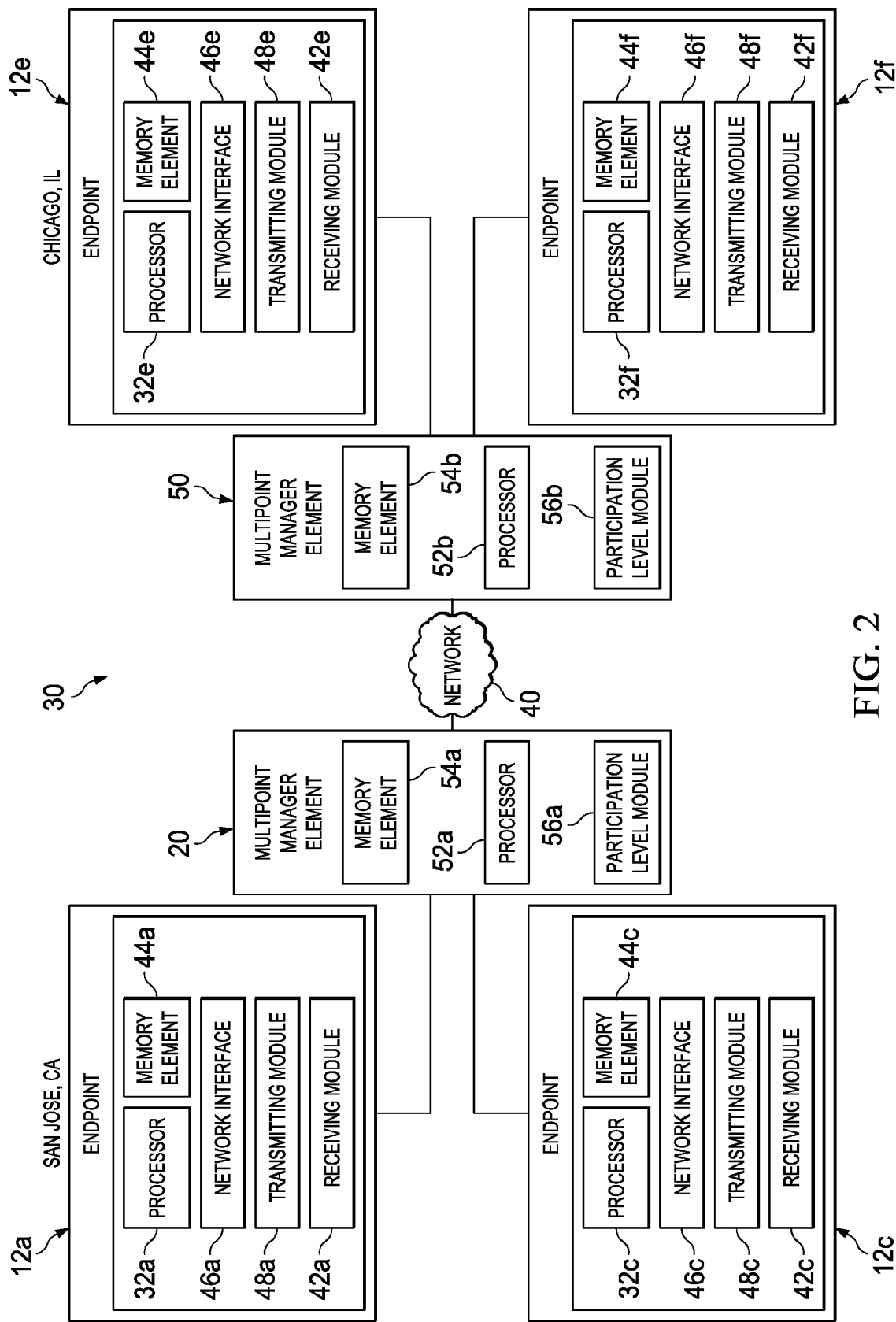
FIG. 2 is a simplified block diagram of a communication system for optimizing image rendering in a conferencing environment in accordance with one embodiment.

Turning to FIG. 2, FIG. 2 is a simplified block diagram illustrating one possible set of details associated with communication system 10. In this example, endpoints 12a and 12c in San Jose are configured to interface with multipoint manager element 20, which is coupled to a network 40. Along similar rationales, endpoints 12e and 12f in Chicago are configured to interface with a counterparty multipoint manager element 50, which is similarly coupled to network 40. In the particular implementation of FIG. 2, endpoints 12a, 12c, 12e, 12f include a respective processor 32a, 32c, 32e, 32f, a respective memory element 44a, 44c, 44e, 44f, a respective network interface 46a, 46c, 46e, 46f, a respective transmitting module 48a, 48c, 48e, 48f, and a respective receiving module 42a, 42c, 42e, 42f. Any one or more of these internal items of the endpoints may be consolidated or eliminated entirely, or varied considerably, where those modifications may be made based on particular communication needs, specific protocols, etc.

Network 40 represents a series of points or nodes of interconnected communication paths for receiving and transmitting packets of information that propagate through communication system 10. Network 40 offers a communicative interface between the endpoints and other network elements (e.g., multipoint manager elements 20, 50), and may be any local area network (LAN), Intranet, extranet, wireless local area network (WLAN), metropolitan area network (MAN), wide area network (WAN), virtual private network (VPN), or any other appropriate architecture or system that facilitates communications in a network environment. Network 40 may implement a UDP/IP connection and use a TCP/IP communication protocol in particular embodiments of the present disclosure. However, network 40 may alternatively implement any other suitable communication protocol for transmitting and receiving data packets within communication system 10. Network 40 may foster any communications involving services, content, video, voice, or data more generally, as it is exchanged between end users and various network elements.

In one example implementation, multipoint manager elements 20, 50 include respective processors 52a-52b, respective memory elements 54a-54b, and respective participation level modules 56a-b, which may dictate the images that are to be rendered on a given display for end users in a video session. Multipoint manager elements 20, 50 can be aware of (and potentially store) information about who is being seen by the end users of the video conference. Multipoint manager elements 20, 50 can selectively distribute signals to various end users using any suitable inputs (e.g., associated with eye gaze, body language, speaker volume, pre-configurations, etc.).

In one particular instance, multipoint manager elements 20, 50 are configured to exchange data in a network environment such that the intelligent screen management functionality discussed herein is achieved. As used herein in this Specification, the term 'network element' is meant to encompass various types of routers, switches, gateways, bridges, loadbalancers, firewalls, servers, inline service nodes, proxies, processors, modules, or any other suitable device, component, element, or object operable to exchange information in a network environment. The network element may include appropriate processors, memory elements, hardware and/or software to support (or otherwise execute) the activities associated with using a processor for screen management functionalities, as outlined herein. Moreover, the network element may include any suitable components, modules, interfaces, or objects that facilitate the operations thereof. This may be inclusive of appropriate algorithms and communication protocols that allow for the effective exchange of data or information.

In a specific implementation, multipoint manager elements 20, 50 include software to achieve (or to foster) the screen management operations, as outlined herein in this document. For example, this could include participation level modules 56a-b, which can be configured to execute many of the activities discussed herein with respect to screen management functions. Furthermore, in one example, multipoint manager elements 20, 50 can have an internal structure (e.g., have a processor, a memory element, etc.) to facilitate some of the operations described herein. In other embodiments, all of these screen management features may be provided externally to these elements or included in some other network element to achieve this intended functionality. Alternatively, any other network element can include this software (or reciprocating software) that can coordinate with multipoint manager elements 20, 50 in order to achieve the operations, as outlined herein.

Note that in certain example implementations, the screen management functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 2] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIG. 2] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Hence, any of the devices illustrated in the preceding FIGURES may include a processor that can execute software or an algorithm to perform the screen management activities, as discussed in this Specification. Furthermore, multipoint manager elements 20, 50 can include memory elements for storing information to be used in achieving the intelligent screen management operations, as outlined herein. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., database, table, cache, key, etc.) should be construed as being encompassed within the broad term 'memory element.' Similarly, any of the potential processing elements, modules, and machines described in this Specification should be construed as being encompassed within the broad term 'processor.'

Figure 3:
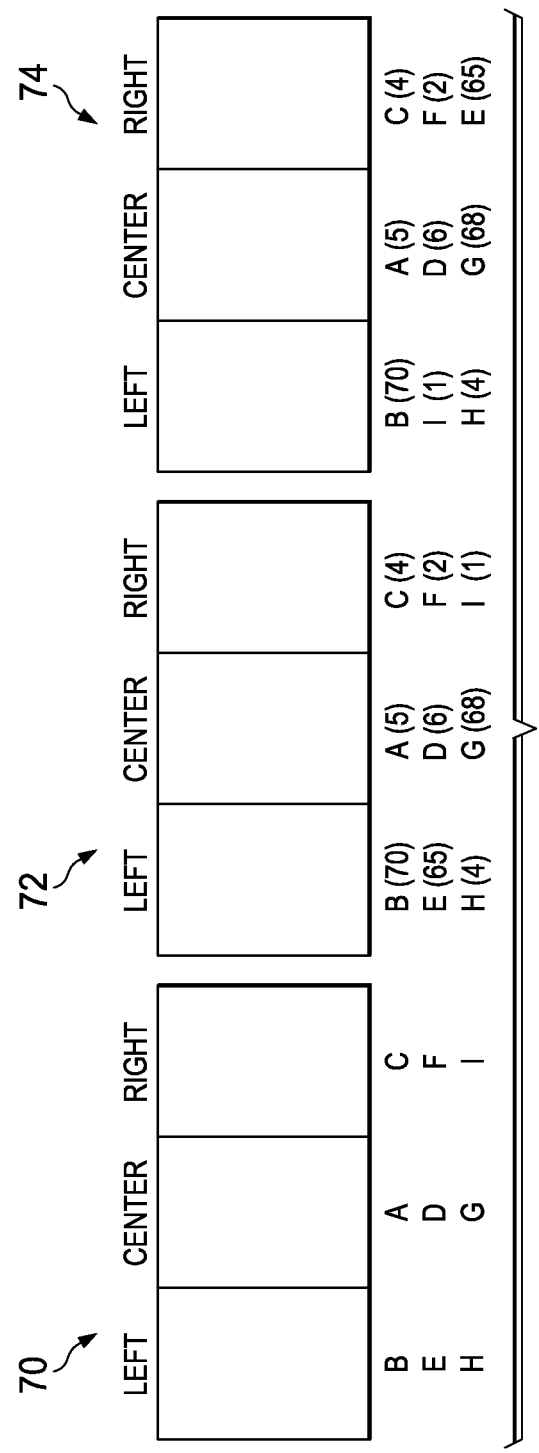
FIG. 3 is a simplified diagram of an example display configuration in accordance with one embodiment.

Turning to FIG. 3, FIG. 3 illustrates one possible operational scenario in which communication system 10 may provide positioning of remote end users on multiple multiscreen displays 70, 72, 74 associated with an endpoint. By way of example, display 70 may represent the screens at the beginning of a meeting, while display 74 may represent the same screens at the end of a meeting, while display 72 may represent the screens at some interim stage of the meeting. Each display 70-74 includes a LEFT, CENTER, and RIGHT screen in this example. In general, each screen is represented in communication system 10 as a virtual position. The capital letters A-I below each screen represent a specific end user.

In this instance, at the beginning of a meeting, communication system 10 may assign end users B, E, and H to a virtual position rendered on the LEFT screen of display 70, assign end users A, D, and G to a virtual position on the CENTER screen, and assign end users C, F, and I to a virtual position on the RIGHT screen. This assignment may be arbitrary, based on a round-robin protocol, or other balancing algorithm so that the number of end users is distributed evenly among available virtual positions (e.g., or based on some pre-determined criteria such as a participant's location). In one example embodiment, a participant's virtual position is sticky so that the end user systematically appears on the same display (subject to modification as described below).

As the meeting progresses, communication system 10 may monitor the participation level of each end user and assign a participation value to each end user. More specifically, in this example, communication system 10 has determined that end user A has a participation value of 5 (as indicated parenthetically below display 72 in FIG. 3), end user B has a participation value of 70, end user C has a participation value of 4, and so forth. Based on these participation values, end users B, E, and G appear to be participating much more actively than end users A, C, D, F, H, and I. However, both B and E are initially assigned to a virtual position on the LEFT screen, which means that communication system 10 may be frequently switching the left screen to accommodate B and E, while the RIGHT screen is occupied by (relatively) inactive end users. Communication system 10 has the intelligence to effectively adjust participant placements to other virtual positions based on their participation values. This optimizes the limited screen real estate available for the video conference. In this example, the reassignment is depicted below display 74, where end user E has been switched to the RIGHT screen and end user I has been switched to the LEFT screen such that active end users B and E are no longer competing for the same screen.

Figure 4:
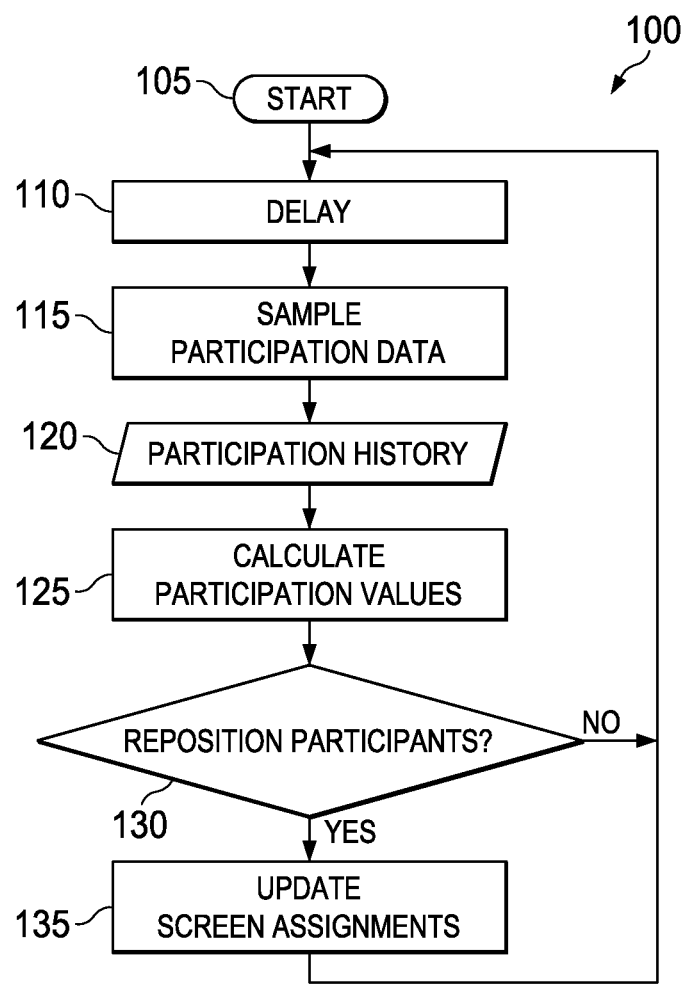
FIG. 4 is a simplified flowchart illustrating example operations associated with one embodiment of the communication system.

FIG. 4 is a simplified flowchart 100 illustrating one potential operation associated with an embodiment of communication system 10. The operation starts at 105, which may correspond to the beginning of a video conference session. After a delay of time T at 110, participation data may be sampled at 115 and stored at 120 as participation history. At 125, participation values for each participant may be calculated based on the participation history. At 130, the participation values can be analyzed to determine if virtual positions should be switched to accommodate participants that are more active. If it is determined that participants should be switched, then the virtual positions may be updated at 135. If it is determined that participants do not need to be switched, then the process returns to 110, and the system may iterate through the same operations until the meeting is terminated, or until the process is otherwise interrupted.

Figure 5:
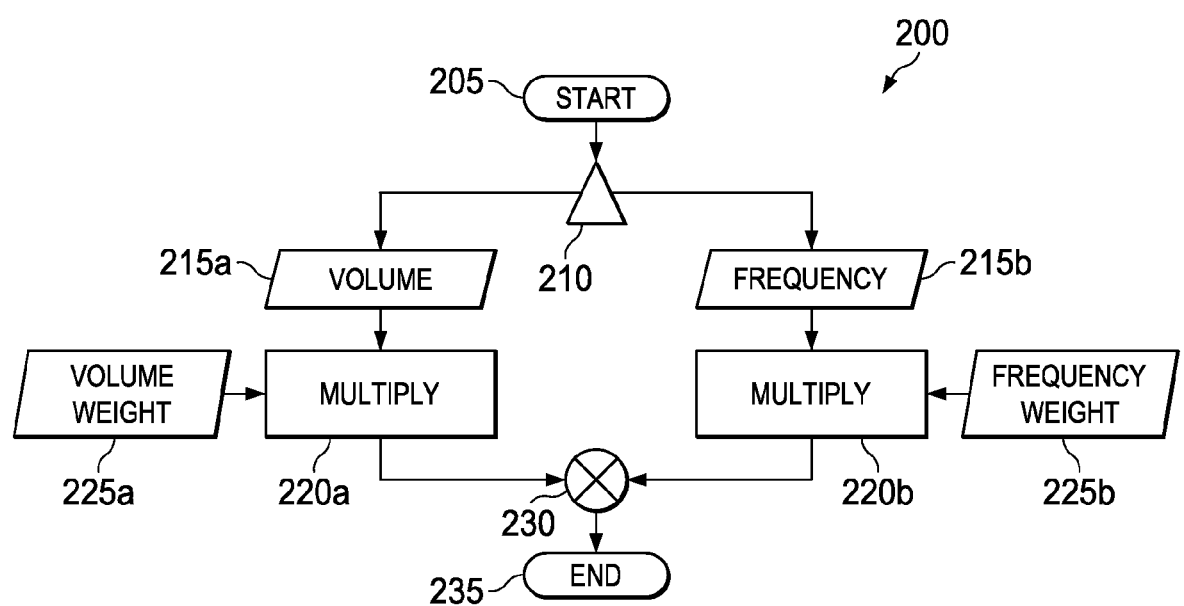
FIG. 5 is a simplified flowchart illustrating example operations associated with calculating participation values in an embodiment of the communication system.

FIG. 5 is a simplified flowchart 200 illustrating one potential process associated with calculating participation values, as may be done in 125 of flowchart 100. The operations may begin at 205, where the participation history can be evaluated, received, or accessed. In the example of flowchart 200, two values are extracted from the participation history at 210 and normalized if appropriate. These values in flowchart 200 are a volume 215a and a frequency 215b of a participant's speech during a video session. These values are, of course, only two possible indicators of activity (i.e., inputs) and are only being provided for illustration purposes. Any number (or combination) of relevant activity indicators can be used (e.g., inputs associated with eye contact, slouching, nodding, arm gestures, the lack of any body movement, or any other suitable body language, movement, gesturing, etc.). At 220a and 220b, these indicators may be multiplied by a set of predetermined weights 225a and 225b, respectively. For example, in many scenarios it may be reasonable to assume that frequency is a better indicator of active participation than volume and, therefore, a greater weight value may be assigned to the frequencies of participation than the voice volume of a speaker in this particular example.

In some embodiments, a negative weight may be assigned to a relevant input, such as in the case of a participant who is preoccupied with a laptop and who makes limited eye contact during the video session. In some embodiments, face recognition may also be used to assign weights. In other instances, face recognition can be coupled to a directory (e.g., in order to access an organizational hierarchy) that assigns an employment title a certain weight. The weighted values can be summed at 230. The process ends at 235, where the weighted values may be passed to another process (e.g., such as 130 in flowchart 100).

In terms of a practical extension to the scenario involving the activities of flowchart 100, the following example is provided. In this example, the values extracted from the participation history represent voice level and body language. Voice level may be normalized within an integer range, such as 1-100, which indicates how loud a participant is speaking. Body language may also be characterized by an integer range from 1-100, which represents how engaged a participant may be based on head movement, slouching, hand and arm gestures, or any other recognizable attribute. Both of these numbers may be generated by an endpoint and embedded in a media packet sent to a multipoint manager element for additional processing. Alternatively, these inputs may simply be monitored and identified by multipoint manager elements 20, 50, which can have the intelligence to suitably detect various input levels. The numerical values are indicative of participation levels and, therefore, dictate the virtual positions of the end users.

In this example, voice level has been identified as a stronger indicator of participation than body language, so voice level has been assigned a weight of 0.75 and body language has been assigned a weight of 0.25. Participation level module 56a may monitor the voice level and body language data at any suitable interval. Each time data is sampled, the values may be weighed and combined to calculate a participation value for each participant.

Thus, at an example time T, participation level module 56a is configured to monitor the participation data, which indicates: (1) participant A has a voice level of 75 and a body language of 20; (2) participant B has a voice level of 10 and a body language of 70; (3) participant C has a voice level of 60 and a body language of 10; and (4) participant D has a voice level of 80 and a body language of 60. Based on this participation data, the participation value of participant A is calculated as 61.25 (0.75*75+0.25*20). Similarly, the participation value of participant B is calculated as 25 (0.75*10+0.25*70), participant C is 47.5 (0.75*60+0.25*10), and participant D is 75 (0.75*80+0.25*60). These values can be used to intelligently adjust the images on corresponding screens during a video conference.

Figure 6:
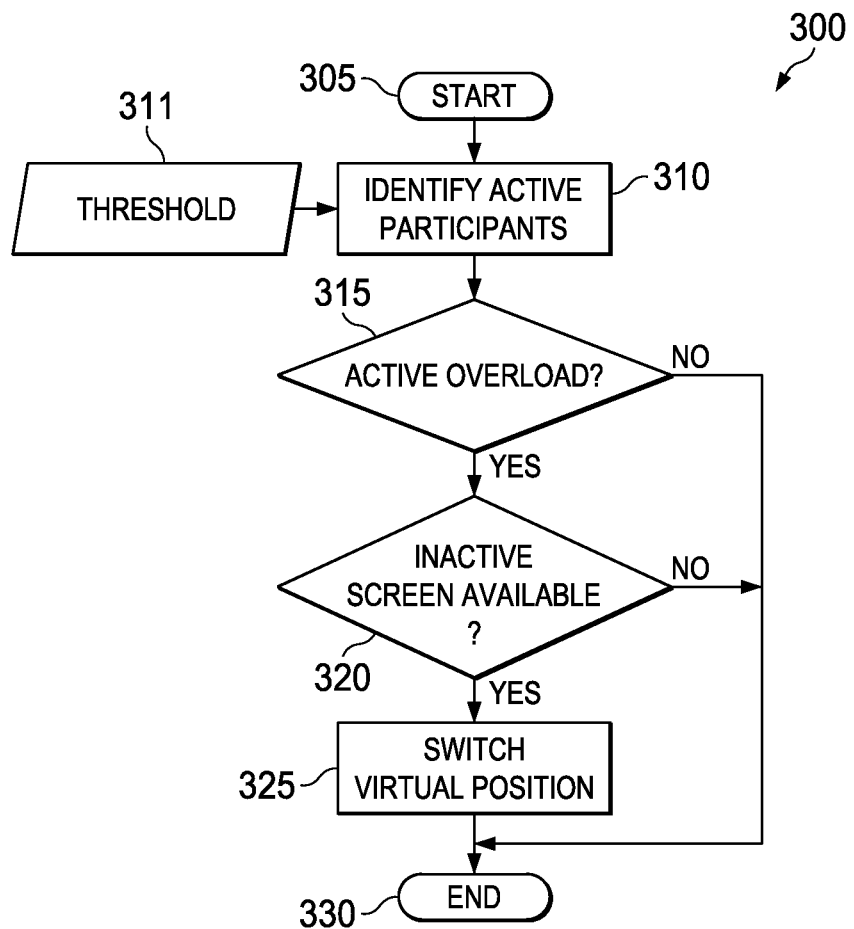
FIG. 6 is a simplified flowchart illustrating example operations associated with analyzing participation values in an embodiment of the communication system.

FIG. 6 is a simplified flowchart 300 illustrating one potential operation associated with analyzing participation values, as may be done in step 130 of flowchart 100. The operations may begin at 305, where a given manager element can access, evaluate, or otherwise receive participation values. At 310, active participants may be identified. In one embodiment, active participants are distinguished from passive participants based on a threshold participation value 311. The threshold participation value may itself be preconfigured, static, or dynamic in various embodiments. A dynamic threshold value, in one embodiment, is a threshold value that may be adjusted during the course of a meeting to accommodate varying participation levels. Additionally, historic participation levels can be used in this dynamic adjustment, or appropriate feedback mechanisms can be used (e.g., a manager that manually adjusts settings for image rendering based on his assessment of who is most attentive in the meeting).

After identifying active participants, the virtual position of each active participant is identified to determine if more than one active participant occupies a single virtual position. This is shown at 315. If no virtual position is overloaded with active participants, no action is taken and the process ends at 330. If at least one virtual position is overloaded, then other virtual positions are analyzed to determine if any such virtual position is occupied by inactive participants at 320. For purposes of illustration, a virtual position occupied by inactive participants is referred to here as an "inactive position." If an inactive position is available, then one of the participants in the inactive position may be switched with (i.e., displaced by) an active participant in an overloaded virtual position, as shown at 325. Preferably, the least active participant in an inactive position is switched. The process ends at 330, where the virtual position assignments may be passed to another process (e.g., passed to 135 in flowchart 100). Hence, the system has used participation levels to effectively render the appropriate images (during the video session) on the corresponding displays such that a more lifelike meeting experience is achieved.

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures. Additionally, although described with reference to particular scenarios, where a particular module, such as a participation level module, is provided within a network element, these modules can be provided externally, or consolidated and/or combined in any suitable fashion. In certain instances, such modules may be provided in a single proprietary unit.

It is also important to note that the steps in the appended diagrams illustrate only some of the possible signaling scenarios and patterns that may be executed by, or within, communication system 10. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   monitoring a plurality of end users, wherein each user generates a plurality of inputs and the end users are involved in a video session in which a plurality of displays are used, wherein at least one of the inputs is associated with a frequency of speech of the end users;
   determining a participation level for each of the end users based on the inputs; and
   determining which image data associated with the end users is to be rendered on a selected one of the plurality of displays based on the participation levels.

2. The method of claim 1, wherein the determining of the participation level includes calculating numeric values associated with the participation levels, and wherein the numeric values are used to assign virtual positions for the end users during the video session.

3. The method of claim 1, wherein one of the participation levels of the end users is preconfigured to have a base level that is higher than the participation levels of the other end users, and wherein the base level is set in accordance with an identity of one of the end users.

4. The method of claim 1, wherein the inputs include body language characteristics and eye gaze metrics of the end users.

5. The method of claim 1, wherein the inputs include a volume of speech associated with the end users.

6. The method of claim 1, wherein the inputs are weighted differently in order to determine the participation levels for each of the end users.

7. The method of claim 1, wherein the participation levels can be adjusted by an administrator during the video session.

8. Logic encoded in non-transitory media that includes code for execution and when executed by a processor operable to perform operations comprising:
   monitoring a plurality of end users, wherein each user generates a plurality of inputs and the end users are involved in a video session in which a plurality of displays are used, wherein at least one of the inputs is associated with a frequency of speech of the end users;
   determining a participation level for each of the end users based on the inputs; and
   determining which image data associated with the end users is to be rendered on a selected one of the plurality of displays based on the participation levels.

9. The logic of claim 8, wherein the determining of the participation level includes calculating numeric values associated with the participation levels, and wherein the numeric values are used to assign virtual positions for the end users during the video session.

10. The logic of claim 8, wherein one of the participation levels of the end users is preconfigured to have a base level that is higher than the participation levels of the other end users, and wherein the base level is set in accordance with an identity of one of the end users.

11. The logic of claim 8, wherein a higher participation level for a selected one of the end users is prioritized over a lower participation level for another one of the end users.

12. The logic of claim 8, wherein the inputs include body language characteristics and eye gaze metrics of the end users.

13. The logic of claim 8, wherein the inputs include a volume of speech associated with the end users.

14. An apparatus, comprising:
   a memory element configured to store data;
   a participation module; and
   a processor operable to execute instructions associated with the data, wherein the processor, the participation module, and the memory element cooperate in order to:
      monitoring a plurality of end users, wherein each user generates a plurality of inputs and the end users are involved in a video session in which a plurality of displays are used, wherein at least one of the inputs is associated with a frequency of speech of the end users;
      determine a participation level for each of the end users based on the inputs; and
      determine which image data associated with the end users is to be rendered on a selected one of the plurality of displays based on the participation levels.

15. The apparatus of claim 14, wherein the determining of the participation level includes calculating numeric values associated with the participation levels, and wherein the numeric values are used to assign virtual positions for the end users during the video session.

16. The apparatus of claim 14, wherein one of the participation levels of the end users is preconfigured to have a base level that is higher than the participation levels of the other end users, and wherein the base level is set in accordance with an identity of one of the end users.

17. The apparatus of claim 14, wherein the inputs include body language characteristics and eye gaze metrics of the end users.

18. The apparatus of claim 14, wherein the inputs include a volume of speech associated with the end users.

19. The apparatus of claim 14, wherein the inputs are weighted differently in order to determine the participation levels for each of the end users.

20. The apparatus of claim 14, wherein the participation levels can be adjusted by an administrator during the video session.

* * * * *